United States Patent [19]

Lalwaney

[11] 3,798,747

[45] Mar. 26, 1974

[54] CONVERSION-ROLLING OF TITANIUM/STEEL BONDED COMPOSITE

[75] Inventor: Narain S. Lalwaney, Woodbury Heights, N.J.

[73] Assignee: E.I. duPont de Nemours and Company, Wilmington, Del.

[22] Filed: June 6, 1972

[21] Appl. No.: 260,245

[52] U.S. Cl............... 29/475, 29/196, 29/497.5, 148/11.5, 148/12, 148/34
[51] Int. Cl............................................. B23k 31/02
[58] Field of Search............. 29/471.1, 471.3, 472.3, 29/475, 494, 497.5, 498, 196; 228/4, 44; 148/11.5, 12, 34

[56] References Cited
UNITED STATES PATENTS

| | | | |
|---|---|---|---|
| 2,908,969 | 10/1959 | Wagner | 29/470.9 |
| 2,985,955 | 5/1961 | Rostoker | 29/471.1 |
| 3,121,949 | 2/1964 | Wright, Jr. | 29/471.5 |
| 3,125,805 | 3/1964 | Horigan, Jr. | 29/492 |
| 3,150,445 | 9/1964 | Butt | 29/497.5 X |
| 3,372,465 | 3/1968 | Frieling, Jr. | 29/474.1 |

*Primary Examiner*—J. Spencer Overholser
*Assistant Examiner*—Robert J. Craig

[57] ABSTRACT

Conversion-rolled titanium/steel bonded composite products having improved mechanical properties desirable for vessel construction are made by heating to 1,400°–1,600°F. a substantially flat metallurgically bonded titanium/steel composite of the character of composites made by explosion bonding, preferably according to the bonding process described in U.S. Pat. No. 3,397,444; commencing rolling of the composite at said temperature and continuing rolling until the thickness is no greater than one-eighth, preferably one-tenth, the prerolling thickness, the composite being roller biaxially, and the time the composite is held at 1,400°–1,600°F. not exceeding 6 hours; and heating the rolled product at 1,200°–1,300°F. for a period of at least about one-half hour.

5 Claims, No Drawings

CONVERSION-ROLLING OF TITANIUM/STEEL BONDED COMPOSITE

BACKGROUND OF THE INVENTION

Several years ago, integrally bonded titanium-clad steel plate having good fabrication qualities was offered to industry for the first time as a result of the discovery and development of the explosion bonding process, as is described, for example, in U.S. Pats. Nos. 3,137,937 and 3,397,444. Titanium-clad steel plate produced by explosion bonding has high bond shear strength and bend ductility and thus is ideally suited for use in the fabrication of titanium-lined steel pressure vessels for the chemical industry.

In bonding titanium and steel by the explosion technique, the area of the composite plate produced may be smaller than desired, e.g., because of the limited widths of titanium sheet or plate commercially available, or because the cost and difficulty of employing extremely large amounts of explosive in a single bonding operation are prohibitive. Also, the thickness of the titanium and/or steel layers may be larger than desired owing to difficulties in performing the technique with thin cladding and/or backer layers, e.g., to produce sheet or strip. Thin-gage and large-area explosion-bonded titanium-clad steel plate and sheet can be provided, however, by subjecting explosion-bonded plate to the conversion-rolling procedure described in U.S. Pat. No. 3,331,121. According to this procedure, the bonded titanium/steel composite is rolled at a temperature of about from 900° to 1,650° F. until the ratio of the wave length to the amplitude of the wavy interface characteristic of explosion-bonded titanium/steel composites is reduced to a ratio in the range of about from 20:1 to 1000:1.

In explosion-bonded titanium/steel composites prepared substantially according to the process described in the aforementioned U.S. Pat. No. 3,397,444, the disclosure of which is incorporated herein by reference, the interfacial bond between the two metals is a substantially diffusionless wavy bond containing, by area, a high percentage, i.e., at least about 70 percent and preferably at least about 85 percent, direct titanium-to-steel bonding with any solidified melt at the interface present in discrete, isolated regions spaced between areas of direct titanium-to-steel bonding. Such bonds are ductile and strong and remain so when rolled under conditions falling within the limits prescribed in the aforementioned U.S. Pat. No. 3,331,121. Nevertheless, it is recognized that the conditions to which the composite is subjected during the conversion-rolling operation can effect changes in the compositional profile of the composite at the bond zone taken in the direction normal to the interface, as well as changes in the local bond zone geometry, and micro-structure of the metals, and that the strength and ductility of the composite can be sensitive to such changes. All of the critical process variables for conversion-rolling need to be precisely defined and properly combined if large-size conversion-rolled explosion-bonded titanium-clad steel plate and sheet having the optimum mechanical properties required for vessel fabrication is to be consistently produced.

SUMMARY OF THE INVENTION

This invention provides an improved process for the elevated-temperature conversion-rolling, i.e., rolling to effect a reduction in the thickness, of a metallurgically bonded titanium/steel composite of the character of composites made by explosion bonding, i.e., conversion-rolling of a substantially flat composite product, e.g., a plate, slab, or billet, comprising a titanium layer and a steel layer bonded together by a substantially diffusionless wavy interfacial bond containing, by area, at least about 70 percent direct titanium-to-steel bonding with any solidified melt at the interface present in discrete regions spaced between areas of direct titanium-to-steel bonding, the process comprising (a) heating the composite product to a temperature in the range of 1,400° to 1,600° F., preferably 1,500° to 1,550° F; (b) commencing rolling the heated composite product at a temperature in said range and continuing rolling until the thickness of the product is no greater than one-eighth, and preferably no greater than about one-tenth, of its pre-rolling thickness, the product being rolled biaxially, and the total time the product is maintained at a temperature in the range of 1,400° to 1,600° F. being no more than 6, and preferably no more than 4, hours; and thereafter (c) heating the rolled product at a temperature in the range of about from 1,200° to 1,300° F. for a period of at least about one-half hour.

During the rolling step, prior to achievement of the necessary thickness reduction, the product may lose heat to such an extent that further thickness reduction becomes difficult with the type of rolling equipment available. In such a case, the composite product may need to be reheated one or more times before rolling can be completed, i.e., Step (a) may be performed two or more times and Step (b) carried out in multiple stages, a stage of Step (b) following each Step (a). In this case, the rolling in the final stage of Step (b) is continued until the thickness of the product is no greater than one-third of the thickness it had when entering that stage. In other words, while the ratio of the product's thickness prior to the commencement of Step (b) to its thickness after completion of Step (b) is at least 8/1, the ratio of the product's thicknesses prior to and after completion of the final stage of Step (b) when the latter is performed in multiple stages is at least 3/1.

DESCRIPTION OF THE PREFERRED EMBODIMENTS

It has been found that products of optimum strength and workability for vessel fabrication are obtained in the conversion rolling of titanium/steel bonded composite products having a bond zone which is characteristic of explosion-bonded products when (a) the composite is brought up to a temperature in the range of 1,400° to 1,600° F. and rolling is commenced at a temperature in this range, (b) the time at which the composite is held at a temperature in this range is limited to a maximum of six hours, (c) rolling is continued until the ratio of the pre-rolling thickness to the thickness produced as a result of rolling is at least 8/1, (d) the composite is rolled biaxially or cross-rolled, i.e., rolled consecutively in two different directions substantially normal to one another, and (e) the composite is heated or annealed at a temperature of about 1,200° to 1,300° F. after rolling has been completed.

The conversion rolling process of the present invention is performed on any titanium/steel bonded composite of generally flat contour, e.g., a slab, plate, billet, etc. wherein the bond zone characteristic of explosion-bonded products is present. Complete flatness is not required in the composite to be rolled. The rolled product obtained is in the nature of a plate or sheet depending on the product's initial thickness and the amount of reduction accomplished. It is important that the rolling of the composite commence at a temperature in the range of 1,400° to 1,600° F., preferably 1,500° to 1,550° F., and continue until the thickness ratio (pre-rolling thickness to thickness produced by rolling) is at least 8/1, preferably at least 10/1. Thickness reductions of this magnitude afford greatly improved bond ductility owing to the fact that any brittle intermediate phases which may form at the interface as a result of the heating applied are permitted to spread out and scatter sufficiently so as to have no deleterious effect on the bond. Beyond the required limit of minimum thickness reduction, the actual reduction employed depends chiefly on the final gage desired. The temperature of the composite when rolling commences is at least 1,400°F. in order to permit the necessary reduction to be accomplished without the necessity of an inordinate number or reheating steps, and no more than 1,600°F. to preclude the formation of excessive amounts of brittle intermediate phases at the interface.

After the titanium/steel bonded composite is heated up to the selected initial temperature for rolling, it is passed through the rolls in the number of passes required to achieve the selected thickness reduction. As one skilled in the art will realize, the number of passes employed in rolling the present clads to the desired thickness will depend upon the capabilities of the rolling mill, bite desired, the dimensions of the final product and the bond strength of the clad. The number of passes usually employed is about 20-50 in each direction for thicker clads and less for thinner clads. In many cases the initial bite is 20 percent depending upon the strength of the mill; larger bites are possible. Naturally, the composite loses heat as the rolling proceeds. Whether or not it is necessary to reheat the composite before rolling is completed, and if so, when to reheat, are factors dependent chiefly on the capability of the rolling equipment and the size and type of heating apparatus available. Reheating is required if the reduction cannot be completed before the temperature drops to a level at which reduction is difficult with the rolling equipment available, e.g., to about 900°-1,100° F. with commonly available rolling mills. If reheating is required, it may be performed before the minimum practical rolling temperature is reached in order to place less of a demand on the rolls, or in order that the area of the composite does not exceed that which can be accommodated by the available heating equipment. Although the heat/roll/reheat/roll schedule can vary considerably depending on the capability of the rolling mill and the heating equipment, the amount of thickness reduction accomplished in the final rolling stage should be such that the thickness ratio for that stage alone (ratio of thicknesses prior to and after completion of the final stage of rolling) is at least 3/1, preferably at least 4/1. This assures good bond ductility.

Another feature of the present process is the biaxial- or cross-rolling of the composite product. In cross-rolling, the product is rolled consecutively in two different directions, each one substantially normal to the other. This procedure results in a product which exhibits reduced directionality or anisotropy, and also allows the size of the product to be increased in two dimensions. The point in the rolling step at which the direction of rolling is changed can vary, and usually depends on the areal dimensions desired. As a practical matter, rolling in the first direction usually is performed to achieve a desired width, while rolling in the second direction gives desired length or thickness. Reheating is conveniently accomplished after the width has been reached, and inasmuch as the thickness ratio for the final rolling stage after reheating is at least 3/1, preferably at least 4/1, the thickness reduction accomplished in the second direction, when reheating is performed, is sufficient to achieve such a ratio. A thickness reduction ratio of not less than about 1.5/1 should be effected in the initial rolling direction and not less than about 3/1 in the final rolling direction.

While an initial rolling temperature of 1,400° to 1,600° F. is necessary in the present process, it is important, from the standpoint of product quality, that the product be maintained at such a temperature for no more than 6 hours, and preferably no more than 4 hours. Inasmuch as the time at this temperature is relatively short after heating has been discontinued, this requirement essentially amounts to controlling the total time that the composite is maintained at the specified temperature during the pre-rolling heating step(s). The post-rolling heating step required to produce good product ductility, and therefore workability, is carried out at a temperature of about from 1,200° to 1,300° F., annealing of the product generally requiring a period of about 1 hour at this temperature per inch of thickness of the rolled product, at least about 0.5 hour being required irrespective of thickness. Thicker products generally require an annealing time of at least about 1 hour per inch of thickness. Much longer periods at this temperature can be employed, however, without deleterious effect. After annealing, the product generally is air-cooled.

The titanium and steel layers in the bonded composite which is conversion-rolled according to the process of this invention can be any combination of unalloyed or alloyed titanium with a carbon or alloy steel or stainless steel which can be bonded explosively to give the characteristic bond zone described above. Preferably, the titanium is unalloyed titanium, i.e., ASTM B265-58T-Grade 1, 2, 3, or 4 Ti; and the steel layer is a carbon or low-alloy steel, e.g., on having the ASTM designation A-212-B (A-516-GR55 to 70) or A-204, or the SAE designation 1008 or 4620, or a ferritic stainless steel, i.e., stanless steel of the AISI 400 series that does not harden by quenching and tempering (e.g., AISI 400, 405, 409, 430, 442, and 446). The composite may be bilayered or trilayered, the latter having a layer of titanium bonded to each surface of the steel.

The present invention is illustrated by the following example.

Example

A titanium-clad steel slab, 89 inches long, 36 inches wide, and 4-9/16 inches thick (13/16-inch 35A titanium on 3-¾ inch A-516GR70 steel) is made according to the procedure described in U.S. Pat. No. 3,397,444, the titanium and steel layers having initially been positioned substantially parallel to each other at a 0.560-inch standoff, the explosive having been a granular mixture of 45 percent 80/20 amatol (80 percent ammonium nitrate/20 percent trinitrotoluene) and 55 percent sodium chloride, the explosive load 36.3 lb/sq ft, and the collision (detonation) velocity 2200-2400 meters per second. The product is bonded over at least 90 percent of the titanium/steel interface by a substantially diffusionless wavy bond containing, by area, about 85 percent direct titanium-to-steel bonding with the remainder being metal-to-solidified melt bonding, the latter being present in discrete regions between areas of direct titanium-to-steel bonding.

The bonded slab is placed in a furnace at 1,550° F. (+0°, −25°) and brought up to furnace temperature in 3 hours. After reaching furnace temperature, the slab is removed from the furnace and passed through rolls in 0.200-inch bites in the 36-inch (original width) direction for a sufficient number of passes to increase the 36-inch dimemsion to 95 inches (the desired final width). The plate then is transferred to the furnace, which is at 1,550° F. (+0°, −25°), and reheated for 30 minutes to furnace temperature. After removal from the furnace, the plate is again rolled, but this time in a direction normal to the width (i.e., normal to the 95-inch dimension), for a sufficient number of passes to achieve a thickness of 0.480 inch. The 89-inch dimension is increased to 280 inches, the final plate length. The ratio of initial to final thicknesses from pre-rolling product to completely rolled product is 9.5/1.

After completion of rolling, and cooling to room temperature, the plate is placed in a furnace, which is at 1,300° F., and kept there for 60 minutes. The plate then is removed from the furnace and allowed to air-cool.

Samples of the rolled plate, transverse as well as longitudinal (i.e., cut in the width as well as length directions), can be bent 180° with titanium in compression with no bond separation. The bond strength in shear is 37,500 psi, well above the 20,000 psi bond strength in shear called for by ASTM specifications for nickel- and stainless steel-clad steel. The tensile requirements for the steel layer are completely met (ASTM Specification A516-71).

Control 1

When the rolling procedure described in the Example is repeated with the exception that the slab is rolled in the 36-inch direction only, the steel fails in the 180° bend test on a transverse sample (89-inch direction), and does not meet the tensile requirements of ASTM Specification A516-71.

Control 2

A 51-inch-wide, 62-inch-long, 2.22-inch-thick titanium clad steel plate (0.44-inch titanium on 1,78-inch steel), made as described in the Example (collsion velocity 2,700-2,800 m/sec), is heated at 1,590°-1,600°F. for 7 hours and rolled to a thickness of 1.14 inches (2/1 reduction) to a size of 75 inches by 80 inches. Cold-forming and flanging of the plate into a pressure vessel head results in partial debonding.

I claim:

1. In a process for conversion-rolling at elevated temperature a substantially flat, metallurgically bonded composite product comprising a titanium layer and a steel layer bonded together by a substantially diffusionless wavy interfacial bond containing, by area, at least about 70 percent direct titanium-to-steel bonding with any solidified melt at the interface present in discrete regions between areas of direct titanium-to-steel bonding, the improvement which comprises:
   a. heating said composite product to a temperature in the range of 1,400° to 1,600° F;
   b. commencing rolling the heated composite product at a temperature in said range and continuing rolling until the thickness of the product is no greater than one-eighth of its pre-rolling thickness, the product being rolled biaxially, and the total time the product is maintained at a temperature in the range of 1,400° to 1,600° F. being no more than 6 hours; and thereafter
   c. heating the rolled product at a temperature in the range of about from 1,200° to 1,300° F. for a period of at least about one-half hour.

2. A process of claim 1 wherein a plurality of Steps (a) is performed and Step (b) is performed in multiple stages, a stage of Step (b) following each Step (a), and the rolling in the final stage being continued until the thickness of the product is no greater than one-third of the thickness it had when entering that stage.

3. In a process for conversion-rolling at elevated temperature a substantially flat, metallurgically bonded composite product comprising a titanium layer and a steel layer bonded together by a substantially diffusionless wavy interfacial bond containing, by area, at least about 70 percent direct titanium-to-steel bonding with any solidified melt at the interface present in discrete regions between areas of direct titanium-to-steel bonding, the improvement which comprises
   a. heating said composite product to a temperature in the range of 1,500° to 1,550° F.;
   b. commencing rolling the heated composite product at a temperature in said range and continuing rolling until the thickness of the product is no greater than about one-tenth of its prerolling thickness, the product being rolled in two different directions substantially normal to one another, the amount of thickness reduction accomplished in said two directions being sufficient to achieve a thickness reduction ratio of not less than 1.5/1 in the initial rolling direction and not less than 3/1 in the final rolling direction, and the total time the product is maintained at a temperature in the range of 1,500° to 1,550° F. being no more than 4 hours; and thereafter
   c. heating the rolled product at a temperature in the range of about from 1,200° to 1,300° F. for a period of at least about 0.5 hour.

4. A process of claim 3 wherein Step (a) is performed twice and Step (b) in two stages, a stage of Step (b) following each Step (a), and the rolling in the final stage being continued until the thickness of the product is no greater than one-third of the thickness it had when entering that stage.

5. A process of claim 4 wherein the direction of rolling in the final stage of Step (b) is substantially normal to the direction of rolling in the first stage thereof.

* * * * *